Aug. 24, 1937.  A. W. ANTHONY, JR., ET AL  2,090,825
PHOTOGRAPHIC PRINTING
Filed Nov. 21, 1935
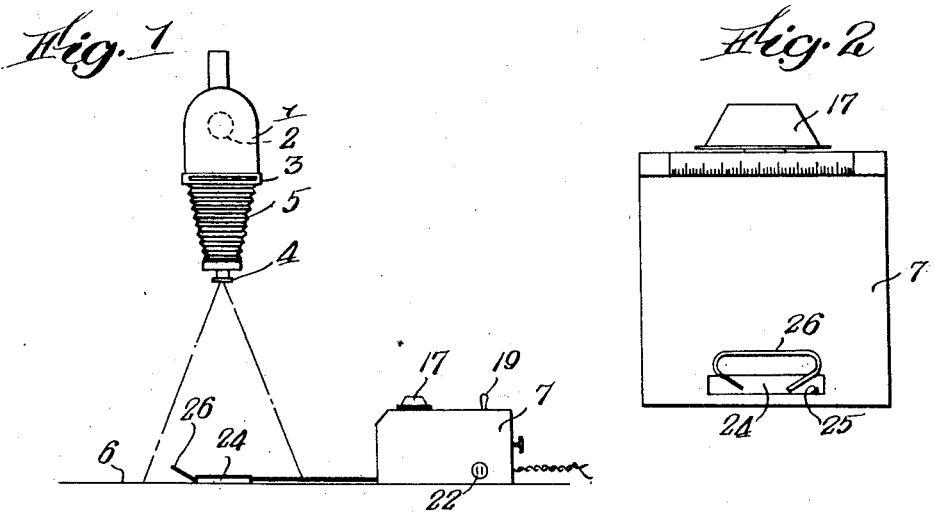
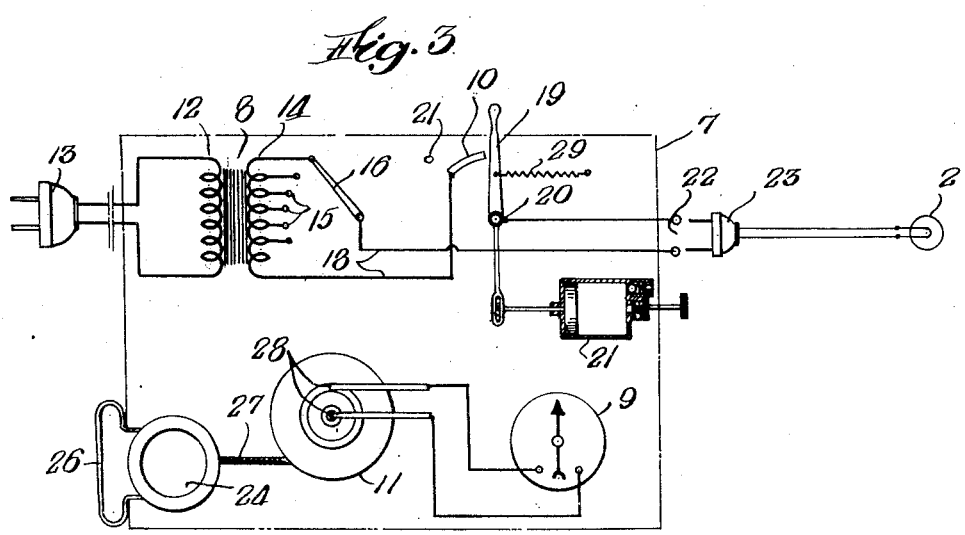
Inventors:
Alfred W. Anthony Jr.
Edward P. Oxnard Patented Aug. 24, 1937

2,090,825

UNITED STATES PATENT OFFICE 2,090,825

PHOTOGRAPHIC PRINTING

Alfred W. Anthony, Jr., Belmont, and Edward P. Oxnard, Cambridge, Mass.

Application November 21, 1935, Serial No. 50,904

4 Claims. (Cl. 95—5)

In photographic printing and enlarging the degree of exposure depends upon a number of factors, such as the density of the negative or other transparency, the sensitivity of the printing paper or other sensitized surface, the degree of enlargement, etc., so that it is difficult to gauge the exposure time accurately and quickly. The object of the present invention is to avoid this difficulty and to provide an exposure control which is simple, quick and accurate, whereby high-grade prints and enlargements may be made with pronounced saving in time of the operator, with increased facility and without waste of printing paper and chemicals.

According to the present invention the usual procedure is reversed. Instead of varying the printing time to suit the particular conditions of each enlargement, a predetermined printing time is selected and the light intensity is adjusted to each particular condition. This is preferably accomplished by means of a light regulator and a photoelectric cell connected to a meter, the cell being placed in the path of the projected image and the light intensity then adjusted until the meter reading corresponds to the predetermined exposure time. While protecting the printing paper from the printing light, as by turning off the light momentarily, the paper is placed in printing position, and the light is then turned on for the predetermined time. In contact printing the cell is preferably placed at the same distance from the transparency in each successive operation. In enlargement work, on the other hand, the cell is preferably placed in the focal plane of the projected image; thus the operator ordinarily needs to pay no attention to variations in the printing light at the focal plane due to variations in degree of enlargement, because the aforesaid adjustment of the light intensity to the predetermined time of exposure automatically takes care of this factor.

By adjusting the light intensity so that the printing time is always the same the operator can readily time the exposure exactly, either manually or with an automatic time switch. In contradistinction to the usual procedure of first making test exposures to determine the proper exposure time and then gauging the time as indicated by the tests, involving a different exposure time for each printing operation, our new method eliminates the trial prints and permits the use of the same printing time for each operation, so that all the operator has to do, to get optimum results the first time, is to adjust the printing light until the meter reads a predetermined value and then turn on the light for the same length of time in each printing operation. Ordinarily, for any particular grade of printing paper, the meter reading should always be the same and inasmuch as the printing time is always the same the danger of error is reduced to a minimum.

The apparatus for practicing this method comprises a unitary structure including means for measuring the light transmitted by the negative and means for varying the printing light until said transmitted light corresponds to the predetermined exposure time for the particular paper to be used. The measuring means preferably comprises sensitive meter connected to a photoelectric cell which occupies only a small part of the picture area and which can be moved to that particular portion of the picture requiring optimum printing. The printing light is preferably varied by means of a variable transformer located in juxtaposition to said meter in the same casing. The casing should be provided with a cord and plug to connect the primary of the transformer to a source of power and with a socket for connecting the light source to the transformer secondary. The casing also preferably includes a time switch in either the primary or secondary circuit to turn on the light for a fixed time in response to a single actuation.

When the printing light is varied by adjustment of the voltage of the light source, rather than by an adjustable diaphragm, the photoelectric cell should have the same characteristics as the printing paper so that variations in the actinic value of the printing light throughout variations in voltage will not have different effects on the cell and paper respectively throughout any portion of the useful range of voltage adjustment, but difference in characteristics may be corrected by a suitable filter in the path of the light.

When using a safe light which substantially affects the photoelectric cell its effect may be counteracted in various ways, as for example by providing the meter indicator with a zero adjustment or by applying a counter E. M. F. in the meter circuit or by means of a light filter for the photocell.

For the purpose of illustration a concrete embodiment of the invention is illustrated in the accompanying drawing, in which, Fig. 1 is a side elevation of the entire apparatus in operative position;

Fig. 2 is an end elevation of the aforesaid unitary structure for measuring and adjusting the light; and Fig. 3 is a circuit diagram showing the electrical connections.

The particular embodiment of the invention chosen for the purpose of illustration comprises a light housing 1 containing a light source 2, a negative holder 3 and a lens holder 4 with an adjustable bellows 5 between the negative holder and the lens holder. 6 represents the top of a table or other suitable support for the paper upon which an enlarged print is to be made from the negative in holder 3.

The aforesaid unitary structure comprises a casing 7 (indicated by broken lines in Fig. 3) containing a transformer 8, a microammeter 9, time switch 10 and a cord reel 11. The transformer 8 comprises a primary 12 connected to a cord leading to a plug 13 for connection to a suitable source of alternating current. The transformer also comprises a secondary 14 having a series of taps leading to the contacts 15 of an adjusting switch 16 having a knob 17 on top of the casing for adjusting the voltage of the secondary circuit 18. The time switch 10 comprises a handle 19 pivoted to the casing at 20 and connected at its lower end to an adjustable dash-pot 21 for adjusting the time the switch remains closed after the handle 19 is swung to the left (Fig. 3) to its extreme position determined by the stop 21. The time switch is connected in the secondary circuit 18, this circuit leading to a socket 22 in the side of the casing 7 to receive the plug 23 of a cord leading to the light source 2.

The photoelectric cell 24 is mounted in a recess 25 in one end of the casing 7 and is provided with a handle 26 for withdrawing the cell from the casing. The photoelectric cell is connected to the meter 9 through a cord 27 wound on the reel 11. The reel 11 is provided with a spring (not shown) for retracting the cell into the casing, the reel operating upon the principle of an ordinary window shade and having connectors of the slip-ring type, as indicated at 28, for interconnecting the cord 27 with the meter 9.

In operation the parts are placed in the relative positions indicated in Fig. 1 with the photoelectric cell 24 located in the focal plane of the projector and in that part of the picture which is to be printed with the greatest degree of fidelity. With the light 2 connected in circuit the variable transformer is adjusted by means of the knob 17 until the indication of meter 9 corresponds to the time of exposure for which the time switch 10 is set, after which the photoelectric cell is retracted into the casing, the light 2 turned off and the enlarging paper placed in position on the surface 6. The time switch 10 is then closed by swinging the handle 19 to the left against the stop 21 to expose the paper for that particular time to which the dash-pot 21 is adjusted, it being understood that the spring 29 slowly moves the handle 19 back to the normal position shown in the drawing wherein the secondary circuit is opened and light 2 extinguished.

In making a series of enlargements with negatives of different densities all the operator has to do with each negative is first to adjust the voltage until the meter 9 reads the same for each negative, aside from closing the switch 10 for each exposure.

It should be understood that the present disclosure is for the purpose of illustration only and that this invention includes all modifications and equivalents which fall within the scope of the appended claims.

We claim:

1. In the projection printing of transparencies of different densities at different ratios of size between transparencies and prints, using an indicator controlled by a light sensitive device to measure the light value at the plane of the sensitized surface to be printed, the method which comprises passing light through a transparency to said device located substantially at said plane in a portion of the projected image selected in accordance with the quality of print desired, adjusting the light until said indicator makes a predetermined indication irrespective of said transparency density and said size ratio, and then, with the same light adjusted as aforesaid, exposing said sensitized surface for a predetermined time irrespective of said transparency density and said size ratio, whereby the operator, throughout changes in densities of successive negatives and throughout changes in said size ratio, need carry in mind only said predetermined indication and said predetermined time.

2. In the projection printing of transparencies of different densities at different ratios of size between transparencies and prints, using an indicator controlled by a light sensitive device to measure the light value at the plane of the sensitized surface to be printed, the method which comprises passing light from an electric lamp through a transparency to said device located substantially at said plane, adjusting the voltage of said lamp until said indicator makes a predetermined indication irrespective of said transparency density and said size ratio, and with the voltage adjusted as aforesaid exposing said sensitized surface with said lamp for a predetermined time irrespective of said transparency density and said size ratio, whereby the operator, throughout changes in densities of successive negatives and throughout changes in said size ratio, need carry in mind only said predetermined indication and said predetermined time.

3. In the projection printing of transparencies of different densities at different ratios of size between transparencies and prints, using an indicator controlled by a light sensitive device to measure the light value at the plane of the sensitized surface to be printed, the method which comprises passing light through a transparency to said device located substantially at said plane in a portion of the projected image selected in accordance with the quality of print desired, adjusting the light until said indicator makes a predetermined indication irrespective of said transparency density and said size ratio, filtering the light during the aforesaid adjustment so that the light has corresponding effects upon said sensitive device and sensitized surface, and then, with the same light adjusted and filtered as aforesaid, exposing said sensitized surface for a predetermined time irrespective of said transparency density and said size ratio, whereby the operator, throughout changes in densities of successive negatives and throughout changes in said size ratio, need carry in mind only said predetermined indication and said predetermined time.

4. In the projection printing of transparencies of different densities at different ratios of size between transparencies and prints, using an indicator controlled by a light sensitive device to measure the light value at the plane of the sensisized surface to be printed, the method which comprises passing light from an electric lamp through a transparency to said device located substantially at said plane, adjusting the voltage of said lamp until said indicator makes a predetermined indication irrespective of said transparency density and said size ratio, filtering the light during the aforesaid adjustment so that the light has corresponding effects upon said sensitive device and sensitized surface, and with the voltage adjusted as aforesaid and the light filtered as aforesaid exposing said sensitized surface with said lamp for a predetermined time irrespective of said transparency density and said size ratio, whereby the operator, throughout changes in densities of successive negatives and throughout changes in said size ratio, need carry in mind only said predetermined indication and said predetermined time.

ALFRED W. ANTHONY, JR.
EDWARD P. OXNARD.